Patented May 9, 1944

2,348,221

UNITED STATES PATENT OFFICE 2,348,221

HYDROXYL DERIVATIVES OF THE CYCLOPENTANO POLYHYDROPHENANTHRENE SERIES AND A PROCESS FOR THE MANUFACTURE OF THE SAME

Willy Logemann, Berlin-Friedenau, and Hans Dannenbaum, Falkenhain-Finkenkrug, near Berlin, Germany, assignors to Schering Corporation, Bloomfield, N. J., a corporation of New Jersey No Drawing. Application January 8, 1940, Serial No. 312,858. In Germany December 24, 1938

19 Claims. (Cl. 260—397.4)

This invention relates to hydroxyl-derivatives of the cyclopentano polyhydrophenanthrene series and a process for the manufacture of the same.

It is well known that lead tetraacetate is capable of converting hydrogen atoms of simply constituted compounds situated in neighbouring position to a keto or a carboxylic group, into hydroxy groups.

We have found that this reaction can generally be employed with compounds of the cyclopentano polyhydrophenanthrene series. Thus, it is possible to realize the following synthesis representing the conversion of an α-hydro carbonylic compound into an α-hydroxy carbonylic compound:

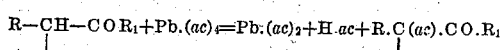

wherein R is a cyclopentano polyhydrophenanthrene radical in the ring system of which the group —CH—CO— may be built in partially or wholly. In the equation $ac$ means —O—CO.CH$_3$, R$_1$ represents any other part of the molecule and may signify, for instance, in the case of a carboxylic acid a hydroxyl group.

Thus, a hydrogen atom located near an activating group, as for instance, the groups —CO, COOH, CN and to a less degree one or more double bonds (according to Schmidt's rule of double bonds as, for instance, in an aromatic system) is attacked by oxidising agents, as, for instance, lead tetraacetate with good yields and is converted into an acyl-oxy group. Although some other oxidising agents react in a similar manner, for instance, selenous acid, oxidising agents such as the lead tetraacetate possess considerable advantages over the usual oxidising agents, for, (1) The reaction may be carried out in homogeneous solution as the tetraacetate can be dissolved very readily in some organic solvents, (2) The speed of reaction is greater, (3) Nevertheless, the course of reaction is relatively uniform and proceeds only to a certain stage, (4) The progress of the reaction can be controlled if desired by iodometric titration whereby the content of the unreacted reagent present at any time in the reaction mixture can be exactly determined, (5) The reagent can at any time be prepared from red lead and glacial acetic acid or may be replaced by a mixture of these two substances.

As starting material there may be used all such compounds of the cyclopentano polyhydrophenanthrene series as have besides an activating group an activated replaceable hydrogen atom. Other groups which are readily affected by oxidation can be protected intermediarily according to methods known per se, for instance, hydroxy groups by esterification or otherwise.

Thereby it has been found that a compound having, for instance, in 3-position a hydroxyl group protected, for instance, by esterification, and a double bond in 5.6-position can be oxidised by means of lead tetraacetate without the double bond or groups in neighbouring position thereto being attacked by the oxidising agent.

On employing a carboxylic acid of the cyclopentano polyhydrophenanthrene series especially such one as has in 17-position a side-chain with the group

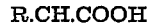

wherein R signifies a hydrocarbon radical or hydrogen, first an acyloxy-carboxylic acid is produced corresponding to the general formula

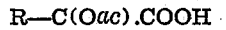

which after conversion into the free hydroxy carboxylic acid is then oxidised to the corresponding ketone

whereby carbondioxide is split off.

On employing, for instance, acetoxybisnorcholanic acid the reaction proceeds in the following manner:

materials having only a hydrogen atom besides the side-chain at the carbon atom 17, as for in-

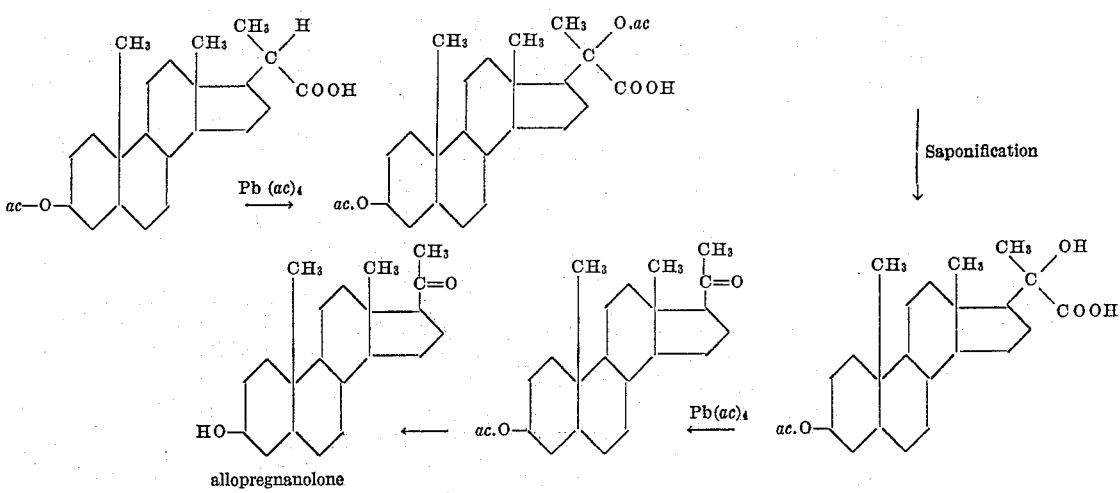

allopregnanolone

The reaction according to this invention is of special importance with respect to the preparation of compounds having the following group at the carbon atom 17

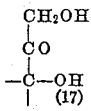

for, such substances have a remarkable cortin-like physiological activity. Compounds of this structure which may be called dihydroxy acetone derivatives can be produced in a simple manner by causing oxidising agents capable of converting a methyl group into a methanol group, to react on compounds of the cyclopentano polyhydrophenanthrene series having in 17 position the group

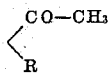

wherein R is a hydroxyl group or a group convertible thereinto, as for instance, an ester- or ether group, such as 17-hydroxy-progesterone and its derivatives.

As derivatives of the above mentioned compounds all those may be employed which are capable of being reconverted into the starting material by simple chemical operations; thus, for instance, the hydroxyl group at the carbon atom 17 may be esterified or etherified, in place of the keto group at the carbon atom 3 there may also be a hydroxyl group or a corresponding ester group. The double bond may be located between the carbon atoms 4 and 5 or 5 and 6, and it may be protected by halogen and the like.

As oxidising agent preferably tetravalent lead salts, such as lead tetraacetate, lead tetrapropinate and the like are employed. But also other heavy metal compounds of higher valency may be used in the form of their oxides, salts and the like as, for instance, manganic or cobaltic salts, for instance, manganic acetate or cobaltic acetate, osmium tetroxide and the like. If desired the acyl derivatives produced thereby can be converted into the free hydroxy compounds according to methods known per se, for instance, by saponification.

The oxidation of the 17-hydroxy compounds of the cyclopentano polyhydrophenanthrene series, as for instance, the 17-hydroxy progesterone has advantages over the oxidation of other starting stance progesterone; for, the tertiary carbon-to-hydrogen bond of the carbon atom 17 which is especially sensitive towards oxidation is already oxidized and, thus, well defined products are obtained.

The reaction may, for instance, be carried out in such a manner, that the components are allowed to react with each other in solution in water or a suitable organic solvent, such as glacial acetic acid or chloroform and that the reaction is assisted by heating.

The compounds obtained according to the present invention are therapeutically of importance or can be converted into substances with hormonal activity according to methods known per se, for instance, by saponification of any acyloxy groups present and/or oxidation, for instance, of secondary hydroxyl groups and the like.

The following examples serve to illustrate the invention without, however, limiting the same to them.

*Example 1*

1 g. of acetoxy bisnorcholenic acid is dissolved in 50 ccs. of glacial acetic acid and heated in a glycerol bath up to 100° C. To this solution 1 mol of crystalline lead tetraacetate of known contents dissolved in a little glacial acetic acid is added whereupon the mixture is heated under repeated shaking until one drop of the solution taken from the mixture with a glass rod no longer colors moistened potassium iodide starch paper. During the reaction the moisture of the air is excluded as much as possible. Then the mixture is poured into cold potassium hydroxide solution and shaken several times with ether. The extracted aqueous phase is then acidified and also extracted with ether for several times. On evaporating the purified and dried ethereal extracts 300 mgs. of neutral constituents and 650 mgs. of acid constituents are obtained which are of different composition from the starting material.

*Example 2*

1 g. of 3-acetoxy bisnorcholenic acid are oxidised with lead tetraacetate as described in Example 1. Thereupon the product obtained is poured into a twenty-fold quantity of water and extracted with ether several times. Then the ether is freed from the acetic acid by repeated washing with water. The ethereal extract is dried with magnesium sulfate and evaporated. 980 mgs. of the light-yellow oil obtained are added to a mixture of 100 ccs. of 2N methyl alcoholic potassium hydroxide solution and are boiled under reflux in a nitrogen atmosphere for 3 hours. Then the mixture is poured into 500 ccs. of 2N of hydrochloric acid, and extracted with ether, whereupon the washed and dried ethereal extract is evaporated. 780 mgs. of a yellowish white amorphous substance are obtained. This crude product is dissolved in a sufficient quantity of glacial acetic acid and is treated with an excess (ca. 1.5–2 mol) of lead tetraacetate dissolved in glacial acetic acid and is kept standing at room temperature for 2 days. Thereupon the mixture is diluted with the five-fold quantity of water and then a little diluted hydrogen peroxide is added to destroy the superfluous lead tetraacetate and the solution extracted with ether several times. The ether is washed several times with diluted potassium hydroxide solution in order to remove the acid constituents and finally with water. From the oily evaporation residue of the washed and dried ethereal extract the ketone obtained is isolated according to methods known per se by means of Girard reagent. Then from this fraction pregnenolone of the melting point of 192° C. is isolated by high vacuum distillation and repeated crystallization from aqueous acetone.

*Example 3*

To a solution consisting of 1000 mgs. of pregnenol-3-one-20 acetate-3 of the melting point of 147° and 25 ccs. of pure glacial acetic acid a quantity of lead tetra-acetate is added corresponding to about 1 mol determined by idiometrical titration and heated to gentle boiling for two hours. Then the reagent is quantitatively consumed. The mixture is poured into ice, and extracted with ether. Then the ether is purified by washing with a dilute solution of caustic soda and distilled water whereupon the solution is dried over magnesium sulfate. On evaporating the dry solution 1085 mgs. of a yellow oil which crystallizes completely are obtained from which by repeated extraction with methanol 600 mgs. of a finely crystallising substance are obtained having a melting point of 156–158° C. From its properties and the analytic composition the product obtained is diacetoxy pregnenolone. Probably the newly introduced acetoxy group is located at the carbon atom 17, replacing the easily reactive hydrogen atom. From the mother liquors some of the starting material is obtained.

*Example 4*

3.7 gs. of 17-acetoxy progesterone are heated in 50 ccs. of pure glacial acetic acid distilled over potassium permanganate and 4.4 gs. of lead tetraacetate until the oxidation agent is consumed. Then the mixture is extracted with ether and the ether is washed with bicarbonate and water. The residue obtained after evaporation of the ether is dissolved in benzene and diluted with pentane until the mixture becomes cloudy. The solution is then passed through aluminum oxide according to the method of chromatographic absorption and then extracted with benzene and ether. From the benzene extracts a crystalline substance can be isolated representing a Δ4-pregnendione-3.20-dioldiacetate-17.21. An ammonia silver nitrate solution is reduced by this substance immediately.

Of course many changes and variations may be made by those skilled in the art in accordance with the principles set forth herein and in the claims annexed hereto.

What we claim is:

1. Method for the manufacture of oxygenated derivatives of the cyclopentano polyhydrophenanthrene series, comprising treating a compound of the cyclopentano polyhydrophenanthrene series having no sterolic side chain at the 17-position and having a reactive hydrogen atom on the α-carbon to an activating portion of the molecule, with an oxidizing agent capable of replacing the reactive hydrogen atom with an oxygen-containing group.

2. Method according to claim 1, wherein the oxidizing agent is lead tetra-acetate.

3. Method according to claim 1, wherein the activation of the replaceable hydrogen atom is due to the presence of a carbonyl group in the molecule of the starting compound.

4. Method according to claim 1, wherein the activation of the replaceable hydrogen atom is due to the presence of a COOH-group in the starting compound.

5. Method according to claim 1, wherein the starting compound is a germinal gland hormone.

6. Method according to claim 1, wherein the starting compound has at the 17-carbon the group —CO.CH₃.

7. Method according to claim 1, wherein the starting compound has at the 17-carbon the group —CO.CH₃, and having in the 3-position a member of the group consisting of hydroxyl and ketonic oxygen and groups convertible thereinto with the aid of hydrolysis.

8. Method for manufacturing oxo compounds of the cyclopentano polyhydrophenanthrene series comprising treating compounds having in the 17-position the group

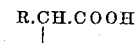

wherein R is a hydrocarbon radical with an oxidising agent capable of replacing the reactive hydrogen atom with an hydroxyl group, whereupon the hydroxy carboxylic acids obtained are converted into the corresponding oxo compounds by oxidation with splitting off of carbonic acid.

9. Method according to claim 8 comprising treating compounds having in the 17-position the group

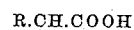

with lead tetra-acetate as oxidising agent.

10. Method according to claim 8 comprising using 3-acyloxy bisnorcholenic acid as starting material.

11. Method for manufacturing dihydroxy acetone derivatives of the cyclopentano polyhydrophenanthrene series comprising causing an oxidising agent capable of replacing a reactive hydrogen atom with an oxygen-containing group, to react on compounds of the cyclopentano polyhydrophenanthrene series having in 17-position the following group

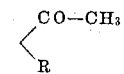

wherein R is a hydroxyl group or a group convertible thereinto with the aid of hydrolysis.

12. Method according to claim 11 comprising using 17-hydroxy progesterone as starting material.

13. Method according to claim 11 comprising using derivatives of the 17-hydroxy progesterone as starting material.

14. Method according to claim 1, wherein the oxidizing agent is a higher valence compound of a heavy metal having plural valences.

15. Method according to claim 1, including the step of protecting groups present in the starting material and sensitive towards oxidation from the attack of the oxidizing agent.

16. Method according to claim 1, including the step of converting the hydroxylated derivative obtained into a keto compound.

17. Compounds of the cyclopentano polyhydrophenanthrene series of the general formula

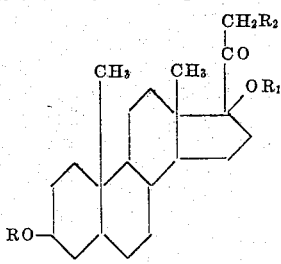

wherein the ring system represents a saturated or unsaturated cyclopentano polyhydrophenanthrene radical of the character of the sterols, R is a member of the class consisting of hydrogen, and ester and ether groups, $R_1$ a member of the class consisting of hydrogen and acyl groups, and $R_2$ a member of the class consisting of hydroxyl and ester groups.

18. Compounds of the cyclopentano polyhydrophenanthrene series of the general formula

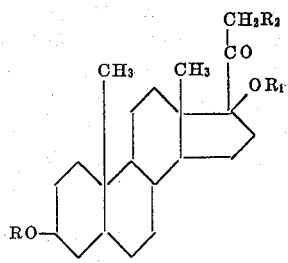

wherein the ring system represents a saturated or unsaturated cyclopentano polyhydrophenanthrene radical of the character of the sterols, R is a member of the class consisting of hydrogen, and ester and ether groups, $R_1$ a member of the class consisting of hydrogen and acyl groups, and $R_2$ a member of the class consisting of hydroxyl and acyl groups.

19. $\Delta_4$-pregnendione-3.20-dioldiacetate-17.21.

WILLY LOGEMANN.
HANS DANNENBAUM.